(12) United States Patent
Wang

(10) Patent No.: US 8,442,925 B2
(45) Date of Patent: May 14, 2013

(54) MUSIC RECOMMENDATION METHOD AND APPARATUS

(75) Inventor: Paul Wang, Beijing (CN)

(73) Assignee: Beijing Ruixin Online System Technology Co., Ltd. (CN)

( * ) Notice: Subject to any disclaimer, the term of this patent is extended or adjusted under 35 U.S.C. 154(b) by 148 days.

(21) Appl. No.: 13/088,484

(22) Filed: Apr. 18, 2011

(65) Prior Publication Data

US 2012/0136814 A1 May 31, 2012

(30) Foreign Application Priority Data

Nov. 30, 2010 (CN) .......................... 2010 1 0568257

(51) Int. Cl.
G06F 15/18 (2006.01)
(52) U.S. Cl.
USPC .............................. 706/12; 707/732; 707/748
(58) Field of Classification Search ..... 706/12; 707/732, 707/748
See application file for complete search history.

(56) References Cited

U.S. PATENT DOCUMENTS

| 7,081,579 | B2 * | 7/2006 | Alcalde et al. .................. | 84/608 |
| 7,958,119 | B2 * | 6/2011 | Eggink et al. .................. | 707/732 |
| 8,234,284 | B2 * | 7/2012 | Shao et al. ..................... | 707/748 |
| 2002/0002899 | A1 * | 1/2002 | Gjerdingen et al. ............ | 84/667 |

FOREIGN PATENT DOCUMENTS

| CN | 101276375 A | 10/2008 |
| CN | 101441667 A | 5/2009 |
| CN | 100555287 C | 10/2009 |

OTHER PUBLICATIONS

The First Office Action for Chinese Patent Application No. 201010568257.9, issued Jun. 27, 2012, with English translation.

* cited by examiner

*Primary Examiner* — Kakali Chaki
*Assistant Examiner* — Mai T Tran
(74) *Attorney, Agent, or Firm* — Cantor Colburn LLP

(57) ABSTRACT

A music recommendation method may include obtaining the music belongingness function of music, which is the set of granularity of music in different dimensions, wherein the dimension is the classification of music and the granularity is the classification of the dimension; obtaining the user belongingness function of a user, which is the set of granularity indicating likes of user in different dimensions; calculating a granularity correlation function by using the music belongingness function and the user belongingness function; calculating the value of the probability function indicating likes of user for music by using the granularity correlation function and a dimension weighting coefficient; and recommending the music to the user when the value of the probability function indicating likes of user for music is greater than a preset threshold. An apparatus applying to the method comprises corresponding modules.

6 Claims, 4 Drawing Sheets

MUSIC RECOMMENDATION METHOD AND APPARATUS

The present invention claims priority under 35 U.S.C. §119 to Chinese Patent Application No. 201010568257.9, filed on Nov. 30, 2010, the entire content of which is incorporated herein by reference.

BACKGROUND OF THE INVENTION (1) Field of the Invention

The present invention relates to the application field of network music, particularly to a method for music recommendation and an apparatus for the same.

(2) Description of Related Art

In the application field of network music, recommendation is a common service which makes a user find music. Most of the recommendation service is based on user behavior. There are various recommendation methods based on user behavior, such as an Also Buy Recommendation Method and User Clustering Method. The mechanism of the Also Buy Recommendation Method is that if most of the users who have listened to music A have also listened to music B, then the possibility that the user who likes the music A also likes the music B is considered comparatively high. Thus, according to the Also Buy Recommendation Method, if it is found that a user has only listened to the music A, then the music B will be recommended to him. The mechanism of the User Clustering Method is aggregating users to similar classification according to the user behavior and then recommending music to the user in the classification according to the typical behavior of the same classification, that is, all the users in the same classification will be provided with a same recommendation.

The above two recommendation methods have the defect that users can not be provided with a personalized recommendation.

SUMMARY OF THE INVENTION

In one general aspect, the present invention proposes a music recommendation method and a music recommendation apparatus, and one technical problem to be solved is to provide personalized recommendation for users to improve users' satisfaction.

A music recommendation method according to one embodiment of the present invention may comprise the steps of:

S1: obtaining the music belongingness function of music, which is the set of granularity of music in different dimensions, wherein the dimension is the classification of music and the granularity is the classification of the dimension, and the expression of the music belongingness function is $A(\text{music}, P_k)=\{p_{kj}|j=1, 2, \ldots, n\}$, $k=1, 2, \ldots m$, wherein $P_k$ is the dimension, $p_{kj}$ is the granularity, m is the number of the dimensions and n is the number of the granularities in a dimension; S2: obtaining the user belongingness function of a user, which is the set of granularity indicating likes of user in different dimensions, and the expression of the user belongingness function is $A(\text{user}, P_k)=\{p_{ki}|=1, 2 \ldots, n\}$, $k=1, 2, \ldots m$, wherein $P_k$ is the dimension, $p_{ki}$ is the granularity, m is the number of the dimensions and n is the number of the granularities in a dimension; S3: calculating a granularity correlation function by using the music belongingness function and the user belongingness function, and the expression of the granularity correlation function is $$f(\text{user, music}, P_k) = \begin{cases} 0; & \text{when } A(\text{music}, P_k) \notin A(\text{user}, P_k) \\ 1; & \text{when } A(\text{music}, P_k) \in A(\text{user}, P_k); \end{cases}$$

S4: calculating the value of the probability function indicating likes of user for music by using the granularity correlation function and a dimension weighting coefficient, and the probability function indicating likes of user for music is $$F(\text{user, music}) = \sum_{k=1}^{m} (\alpha_k \cdot f(\text{user, music}, P_k)),$$

wherein $\alpha_k$ is the dimension weighting coefficient; and S5: when the value of the probability function indicating likes of user for music is greater than a preset threshold ω, recommending the music to the user.

In some embodiment of the aforementioned method, in the step S1, the music belongingness function of music is obtained by receiving manual input or performing program identification.

In some embodiment of the aforementioned method, at least one user belongingness function is assigned to the user.

In some embodiment of the aforementioned method, in the step S2, the user belongingness function of a user is obtained by receiving user input or analyzing user behavior.

In some embodiment of the aforementioned method, the step for obtaining the user belongingness function by analyzing user behavior comprises the following steps: S21: getting the behavior function indicating likes of user for music according to the behavior that a user takes to music, and the expression of the behavior function indicating likes of user for music is $$F'(\text{user, music}) = \sum_{k=1}^{y} (q_k \cdot Q_k(\text{user, music})),$$

wherein $Q_k(\text{user, music})$ represents the result value of the $Q_k$ behavior a user takes to music; $q_k$ is a behavior weighting coefficient and y is the number of the kinds of behavior; S22: calculating the acquaintance function between a user and a granularity by using the behavior function, and the expression of the acquaintance function is $$f'(\text{user}, p_{ki}) = \sum_{j=1}^{x} F'(\text{user}, m_j) = \sum_{j=1}^{x} \sum_{k=1}^{y} q_k \cdot Q_k(\text{user}, m_j),$$

wherein $m_j$ is the music which belongs to a granularity $p_{ki}$ and x is the amount of the music which belongs to the granularity $p_{ki}$; and S23: using the z granularities corresponding to the top z values as granularities in z user belongingness functions respectively to form z user belongingness functions, wherein the top z values are obtained from the descending values of the acquaintance function between a user and the granularities in each dimension, $z \geq 1$.

A music recommendation apparatus according to one embodiment of the present invention may comprise: a music belongingness function obtaining unit for obtaining a music belongingness function, which is the set of granularity of music in different dimensions, wherein the dimension is the classification of music and the granularity is the classification of the dimension, and the expression of the music belongingness function is A(music, $P_k$)={$p_{kj}$|j=1, 2, ..., n}, k=1, 2, ... m, wherein $P_k$ is the dimension, $p_{kj}$ is the granularity, m is the number of the dimensions and n is the number of the granularities in a dimension; a user belongingness function obtaining unit for obtaining a user belongingness function, which is the set of granularity indicating likes of user in different dimensions, and the expression of the user belongingness function is A(user, $P_k$)={$p_{ki}$|i=1, 2 ..., n}, k=1, 2, ... m, wherein $P_k$ is the dimension, $p_{ki}$ is the granularity, m is the number of the dimensions and n is the number of the granularities in the dimension; a granularity correlation function calculating unit for calculating a granularity correlation function by using the music belongingness function and the user belongingness function, and the expression of the granularity correlation function is $$f(\text{user, music}, P_k) = \begin{cases} 0; & \text{when } A(\text{music}, P_k) \notin A(\text{user}, P_k) \\ 1; & \text{when } A(\text{music}, P_k) \in A(\text{user}, P_k); \end{cases}$$

a probability function calculating unit for calculating the value of the probability function indicating likes of user for music by using the granularity correlation function and a dimension weighting coefficient, and the probability function indicating likes of user for music is $$F(\text{user, music}) = \sum_{k=1}^{m} (\alpha_k \cdot f(\text{user, music}, P_k)),$$

wherein $\alpha_k$ is the dimension weighting coefficient; and a recommendation unit for recommending music to a user when the value of the probability function indicating likes of user for music is greater than a preset threshold.

In some embodiment of the aforementioned apparatus, the music belongingness function obtaining unit obtains the music belongingness function of music by receiving manual input or performing program identification.

In some embodiment of the aforementioned apparatus, at least one user belongingness function is assigned to the user.

In some embodiment of the aforementioned apparatus, the user belongingness function obtaining unit obtains the user belongingness function of a user by receiving user input or analyzing user behavior.

In some embodiment of the aforementioned apparatus, the user belongingness function obtaining unit comprises:

a behavior function calculating module for getting the behavior function indicating likes of user for music according to the behavior that a user takes to music, and the expression of the behavior function indicating likes of user for music is $$F'(\text{user, music}) = \sum_{k=1}^{y} (q_k \cdot Q_k(\text{user, music})),$$

wherein $Q_k$(user, music) represents the result value of the $Q_k$ behavior that a user takes to music, $q_k$ is a behavior weighting coefficient and y is the number of the kinds of behavior;

an acquaintance function calculating module for getting the acquaintance function between a user and a granularity by calculation using the behavior function, and the expression of the acquaintance function is $$f'(\text{user}, p_{ki}) = \sum_{j=1}^{x} F'(\text{user}, m_j) = \sum_{j=1}^{x} \sum_{k=1}^{y} q_k \cdot Q_k(\text{user}, m_j),$$

wherein $m_j$ is the music which belongs to a granularity $p_{ki}$ and x is the amount of the music which belongs to the granularity $p_{ki}$; and a user belongingness function forming module for using the z granularities corresponding to the top z values as granularities in z user belongingness functions respectively to form z user belongingness functions, wherein the top z values are obtained from the descending values of the acquaintance function between a user and the granularities in each dimension, z≧1.

From the aforementioned technical solutions, it would be known that the embodiment of the present has the advantageous effects of providing personalized recommendation for users to improve users' satisfaction.

The above and other objects, features and advantages of the present invention will become more apparent through the following description of preferred embodiments with reference to the accompanying drawings.

DETAILED DESCRIPTION OF THE EMBODIMENTS

The specific embodiments of the present invention will be described in detail hereinafter. It shall be noted that the embodiments described herein are intended to illustrate but not to limit the present invention.

Figure 1:
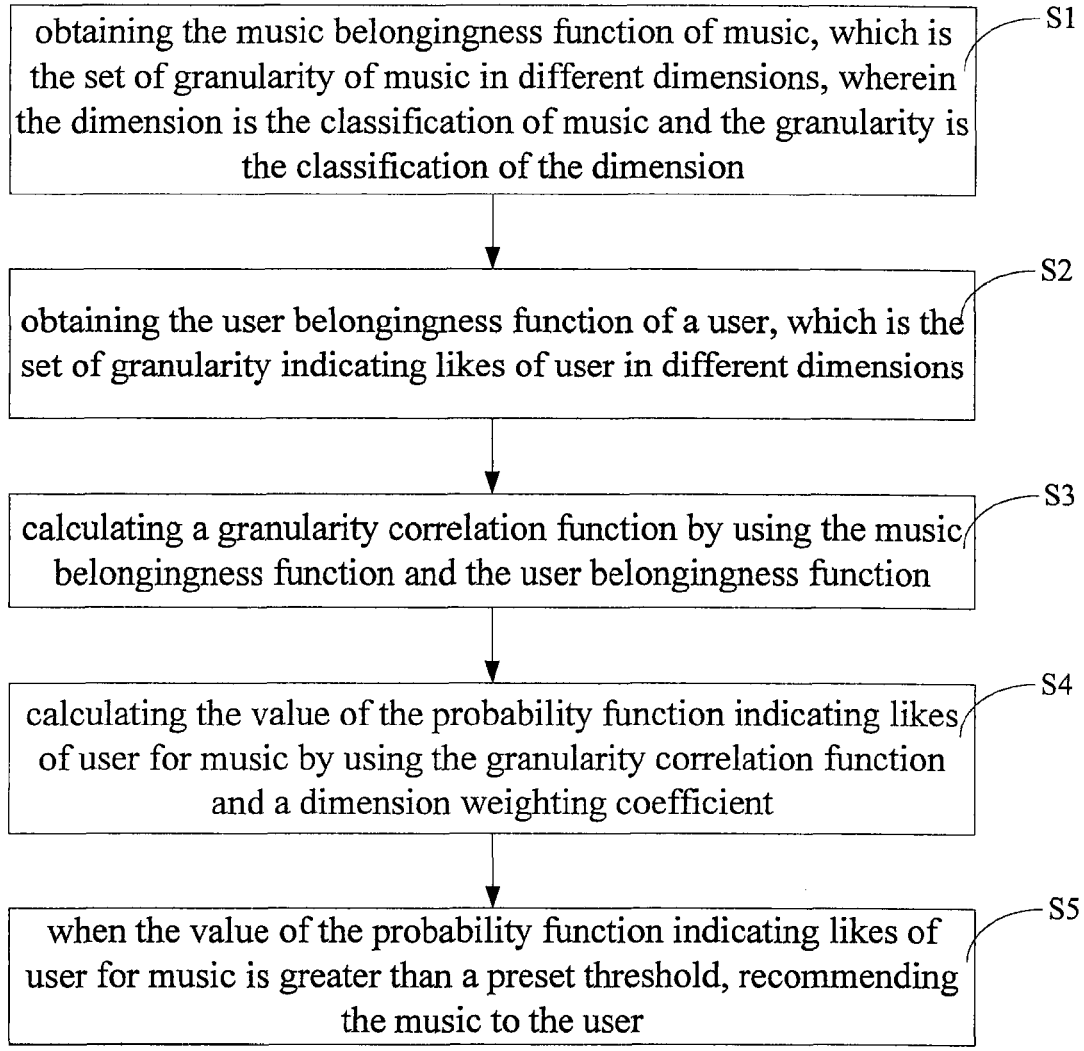
FIG. 1 shows a flow chart of the music recommendation method according to an embodiment of the present invention.

As shown in FIG. 1, it is a flow chart showing the music recommendation method according to an embodiment of the present invention. The music recommendation method is applied to a music recommendation apparatus, which may be an online music recommendation apparatus in the internet or a music recommendation apparatus not connected to a network. The music recommendation method comprises the following steps:

S1: the music belongingness function of music is obtained. The music belongingness function is the set of granularity of music in different dimensions, wherein the dimension is the classification of music and the granularity is the classification of the dimension, and the expression of the music belongingness function is A(music, $P_k$)={$p_{kj}$|j=1, 2, ..., n}, k=1, 2, ... m, wherein $P_k$ is the dimension, $p_{kj}$ is the granularity, m is the number of the dimensions and n is the number of the granularities in a dimension.

In detail, the expression of the relationship between the dimension $P_k$ and the granularity $p_{kj}$ is $P_k$:{$p_{k0}$, $p_{k1}$, $p_{k2}$, ..., $p_{kn}$}.

First, the dimension and the granularity are illustrated by examples. If the music is classified according to age, language, singer and style, the dimension and the granularity may be configured as follows.

If dimension $P_1$ represents age, the granularities therein may be that $p_{10}$ is unknown, $p_{11}$ is before the 1970s, $p_{12}$ is the 1970s-1980s, $p_{13}$ is the 1980s-1990s, $p_{14}$ is the 1990s-2000s and $p_{15}$ is in the 2000s, which is described by expression as:

$P_1$:{unknown, before the 1970s, the 1970s-1980s, the 1980s-1990s, the 1990s-2000s, in the 2000s}.

If dimension $P_2$ represents language, the granularities therein may be that $p_{20}$ is unknown, $p_{21}$ is Mandarin, $p_{22}$ is Cantonese, $p_{23}$ is Minnan dialect, $p_{24}$ is English, $p_{25}$ is Japanese, $p_{26}$ is Korean ... and $p_{2n}$ is French, which is described by expression as:

$P_2$:{unknown, Mandarin, Cantonese, Minnan dialect, English, Japanese, Korean, . . . , French}.

If dimension $P_3$ represents singer, the granularities therein may be that $p_{30}$ is unknown, $p_{31}$ is Jacky Cheung, $p_{34}$ is Leslie Cheung, $p_{35}$ is Jay Chou ... and $p_{3n}$ is Zhang Xinzhe, which is described by expression as:

$P_3$:{unknown, Jacky Cheung, Leslie Cheung, Jay Chou, . . . , Zhang Xinzhe}.

If dimension $P_4$ represents style, the granularities therein may be that $p_{40}$ is unknown, $p_{41}$ is an inspirational song, $p_{42}$ is a folk song, $p_{43}$ is rock, $p_{44}$ is lyrical music, $p_{45}$ is pop music . . . and $p_{4n}$ is dance music, which is described by expression as:

$P_4$:{unknown, inspirational song, folk song, rock, lyrical music, pop music, . . . , dance music}.

Any piece of music must belong to a set of the granularity $p_{kj}$ in the dimension $P_k$, and a piece of music may be described by the music belongingness function as A(music, $P_k$)={$p_{kj}$|j=1, 2, . . . , n}. For example, the song "Chrysanthemum Stage" has the granularities "in the 2000s", "Mandarin", "Jay Chou" and "pop music" in the dimensions $P_1$, $P_2$, $P_3$ and $P_4$ respectively, and the song is described by the music belongingness function as {$p_{15}$, $p_{21}$, $p_{35}$, $p_{45}$}.

In an embodiment, the method for obtaining the music belongingness function comprises receiving manual input or performing program identification, wherein the manual input means performing inputting in categories on each piece of music in each dimension by manual operation; and the program identification means performing identifying automatically on each piece of music in each dimension by software program.

S2: the user belongingness function of a user is obtained. The user belongingness function is the set of granularity indicating likes of user in different dimensions, and the expression of the user belongingness function is A(user, $P_k$)={$p_{ki}$|i=1, 2 . . . , n}, k=1, 2, . . . m, wherein $P_k$ is the dimension, $p_{ki}$ is the granularity, m is the number of the dimension and n is the number of the granularities in a dimension.

Any user must belongs to a set of the granularity $p_{ki}$ in the dimension $P_k$, and a user is described by the user belongingness function as A(user, $P_k$)={$p_{ki}$|i=1, 2 . . . , n}, k=1, 2, . . . m. For example, the granularities indicating likes of user A in the dimension $P_1$, $P_2$, $P_3$ and $P_4$ are "the 1990s-2000s", "Mandarin", "Jacky Cheung" and "pop music" respectively, and the user A is described by the user belongingness function as {$p_{14}$, $p_{21}$, $p_{31}$, $p_{45}$}.

In an embodiment, the method for obtaining the user belongingness function comprises receiving user input, that is, receiving the selection of granularity in each dimension performed by a user or analyzing user behavior, that is, analyzing the behavior which a user makes to identify the granularity in each dimension of the user.

In another embodiment, a user may have one or more user belongingness functions, that is, one or more user belongingness functions may be assigned to a user to characterize one or more tastes of the user more completely. For example, a certain user may have two user belongingness functions, which are {in the 2000s, Mandarin, Jay Chou, pop music} and {the 1990s-2000s, Mandarin, Faye Wong, pop music} respectively.

S3: a granularity correlation function is calculated by using the music belongingness function and the user belongingness function, and the expression of the granularity correlation function is $$f(\text{user, music}, P_k) = \begin{cases} 0; & \text{when } A(\text{music}, P_k) \notin A(\text{user}, P_k) \\ 1; & \text{when } A(\text{music}, P_k) \in A(\text{user}, P_k). \end{cases}$$

S4: the value of the probability function indicating likes of user for music is calculated by using the granularity correlation function and a dimension weighting coefficient, and the probability function indicating likes of user for music is $$F(\text{user, music}) = \sum_{k=1}^{m} (\alpha_k \cdot f(\text{user, music}, P_k)),$$

wherein $\alpha_k$ is the dimension weighting coefficient. For example, for all $P_k$ (k=1, 2, . . . m), $$\sum_{k=1}^{m} \alpha_k = 1$$

is set, and therefore 0≦F(user, music)≦1.

Here, the dimension weighting coefficient is used for indicating the degree that a dimension reflect the taste of a user. In the case of the four dimensions $P_1$, $P_2$, $P_3$ and $P_4$ in the above example, $P_1$ is age, which may reflect the taste of a generation for music, so the dimension weighting coefficient thereof $\alpha_1$ may be set greater, such as setting $\alpha_1$=0.3. $P_2$ is language, and the degree that a language reflects the taste of a user is not very strong, so the dimension weighting coefficient thereof $\alpha_2$ may be set smaller, such as setting $\alpha_2$=0.1. $P_3$ is singer, which may reflect the taste of a user well, so the dimension weighting coefficient thereof $\alpha_3$ should be set greater, such as setting $\alpha_3$=0.4. $P_4$ is style, which may reflect the certain taste degree of a user, so the dimension weighting coefficient thereof $\alpha_4$ is set to, for example, 0.2.

S5: when the value of the probability function indicating likes of user for music is greater than a preset threshold ω, the music is recommended to the user.

The person skilled in the art may perform classification on the dimension, perform prescribing on the granularity and perform selection on the dimension weighting coefficient $\alpha_k$ and threshold ω according to the actual situation, and may update those according to the change of actual situation. Such modifications should fall within the protection scope of the present invention.

In addition, the person skilled in the art may understand the above step S1 and S2 have not precedence relationship in time sequence, that is, either the step S1 or the step S2 may be performed first, which does not affect the realization of follow-up technical solution and the technical effects of this invention.

The embodiments proposed in the present invention may provide personalized recommendation for different users according to the user belongingness function of each user and the music belongingness function of each piece of music, so as to improve users' satisfaction.

A specific embodiment of the present invention will be described in detail hereinafter.

In this embodiment, the four dimensions $P_1$ age, $P_2$ language, $P_3$ singer and $P_4$ style are still selected, and the dimension weighting coefficient of $P_1$ age $\alpha_1$ is 0.3, the dimension weighting coefficient of $P_2$ language $\alpha_2$ is 0.1, the dimension weighting coefficient of $P_3$ singer $\alpha_3$ is 0.4 and the dimension weighting coefficient of $P_4$ style $\alpha_4$ is 0.2; and the preset threshold $\omega$ is 0.5.

It is obtained that the user belongingness function of the user A is {in the 2000s, Mandarin, Jay Chou, pop music} and the user belongingness function of the user B is {the 1990s-2000s, Mandarin, Faye Wong, pop music} after analyzing the user behavior.

For example, the song A "Blue and White Porcelain" has the granularities "in the 2000s", "Mandarin", "Jay Chou" and "pop music" in the dimension $P_1$, $P_2$, $P_3$ and $P_4$ respectively, and then it is described by the music belongingness function as {in the 2000s, Mandarin, Jay Chou, pop music}.

It is got that the granularity correlation function between the song A and the user A is f(user A, song A, $P_1$)=1; f(user A, song A, $P_2$)=1; f(user A, song A, $P_3$)=1; f(user A, song A, $P_4$)=1.

The probability that the user A likes the song A is 0.3*1+0.1*1+0.4*1+0.2*1=1, and the calculated value of a probability function is greater than threshold $\omega$, so the user A may be recommended the song A "Blue and White Porcelain".

In addition, it may be got that the granularity correlation function between the song A and the user B is f(user A, song B, $P_1$)=0; fuser A, song B, $P_2$)=1; f(user A, song B, $P_3$)=0; f(user A, song B, $P_4$)=1.

The probability that the user B likes the song A is 0.3*0+0.1*1+0.4*0+0.2*1=0.3, and the calculated value of a probability function is less than threshold $\omega$, so the user B does not be recommended the song A "Blue and White Porcelain".

Figure 2:
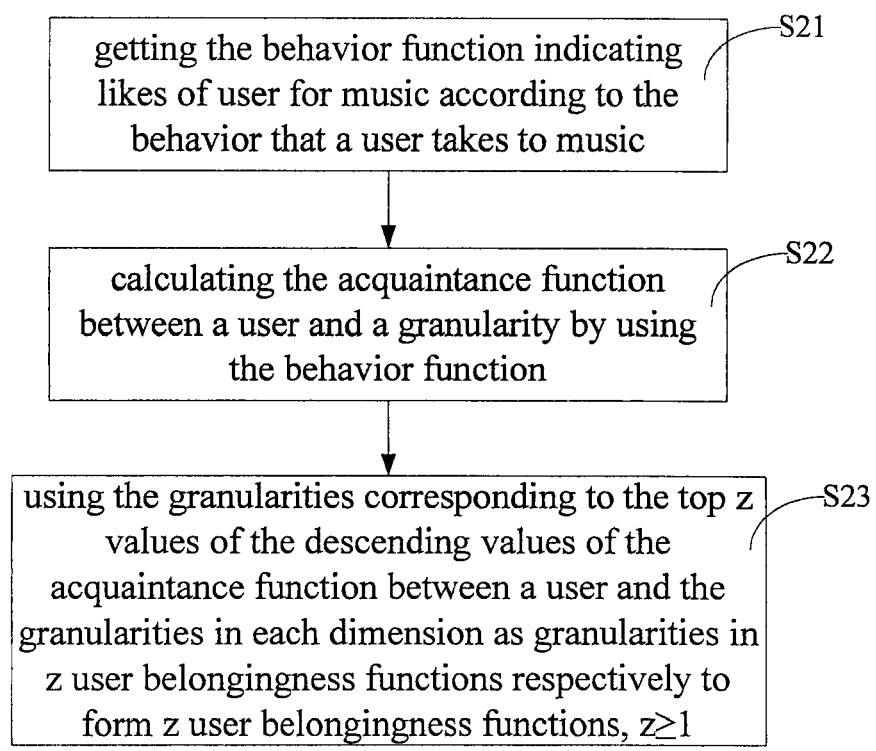
FIG. 2 is a flow chart of the method that the user belongingness function is obtained by analyzing user behavior according to an embodiment of the present invention.

As shown in FIG. 2, it is a flow chart that the user belongingness function is obtained by analyzing user behavior according to an embodiment of the present invention. In this embodiment, the method for obtaining user behavior comprises the following steps.

S21: the behavior function indicating likes of user for music is got according to the behavior that a user takes to music, and the expression of the behavior function indicating likes of user for music is $$F'(\text{user, music}) = \sum_{k=1}^{y} (q_k \cdot Q_k(\text{user, music})),$$

wherein $Q_k$ represents the behavior a user takes to music, such as downloading as a color bell, playing or commenting, $q_k$ is a behavior weighting coefficient, y is the number of the kind of behavior and $Q_k$(user, music) represents the result value of the $Q_k$ behavior a user takes to music, which may be defined according to the behavior $Q_k$. For example, when a user takes behavior to music, $Q_k$(user, music)=1 is defined, and when a user doesn't take behavior to music, $Q_k$(user, music)=0 is defined. Preferably, the default of $Q_k$(user, music) is 0, and the value of $Q_k$(user, music) becomes 1 when a user takes behavior to music. Here, the behavior weighting coefficient is used for expressing the degree that behavior reflect the taste of a user. For example, $-1 \leq q_k \leq 1$ is set.

For example, it is defined that $Q_1$ represents the behavior of downloading a color bell, $Q_2$ represents playing behavior and $Q_3$ represents the commenting behavior.

In the case of the above three behavior, the behavior that a user downloads a certain piece of music as a color bell may reflect the user prefers the music, so the behavior weighting coefficient of the behavior $q_1$ may be set to 0.35; the behavior that a user plays a certain piece of music may represent the user might like the music, so the behavior weighting coefficient of the behavior $q_2$ may be set to 0.2; and the behavior that a user comments on a certain piece of music may reflect the taste of the user intuitively, so the behavior weighting coefficient of the comment behavior $q_3$ may be set to 0.45 if a user comments that he likes the music and may be set to −0.45 if a user comments that he does not like the music.

The person skilled in the art may perform prescribing on the kind and number of the behavior, perform selection on the behavior weighting coefficient $q_k$ according to the actual situation, and may update those according to the change of actual situation. Such changes should fall within the protection scope of the present invention.

S22: the acquaintance function between a user and a granularity is calculated by using the behavior function of a user, and the expression of the acquaintance function is $$f'(\text{user}, p_{ki}) = \sum_{j=1}^{x} F'(\text{user}, m_j) = \sum_{j=1}^{x} \sum_{k=1}^{y} q_k \cdot Q_k(\text{user}, m_j),$$

wherein $m_j$ is the music which belongs to a granularity $p_{ki}$ and x is the amount of the music which belongs to the granularity $p_{ki}$.

The acquaintance function may characterize the closeness of relationship between a user and a granularity $p_{ki}$. From the expression of the acquaintance function, it may be seen that the acquaintance function between a user and a certain granularity is got by summing the behavior function between the user and the music which belongs to the granularity.

S23: The z granularities corresponding to the top z values is used as granularities in z user belongingness functions respectively to form z user belongingness functions, wherein the top z values are obtained from the descending values of the acquaintance function between a user and the granularities in each dimension, $z \geq 1$.

For example, in the singer dimension, the top three values of the descending values of the acquaintance function between a user and a granularity are "Jay Chou", "Faye Wong" and "Tsai Chin" respectively, then the corresponding granularities "Jay Chou", "Faye Wong" and "Tsai Chin" are used as granularities in three formed user belongingness functions respectively.

From the steps S21, S22 and S23 in this embodiment, it may be seen that the behavior function indicating likes of user for music F'(user, music) will be changed whenever a user take behavior $Q_k$, and the acquaintance function between a user and a granularity f'(user, $p_{ki}$) may be changed accordingly, so that the user belongingness function might be also changed with it. In this way, it is possible that continuous updating of the recommendation result according to user behavior is realized so as to ensure accurate recommendation.

Being applied to a music recommendation apparatus, the music recommendation method of the present invention may be implemented by computer executable program executed by hardware such as a computer.

Figure 3:
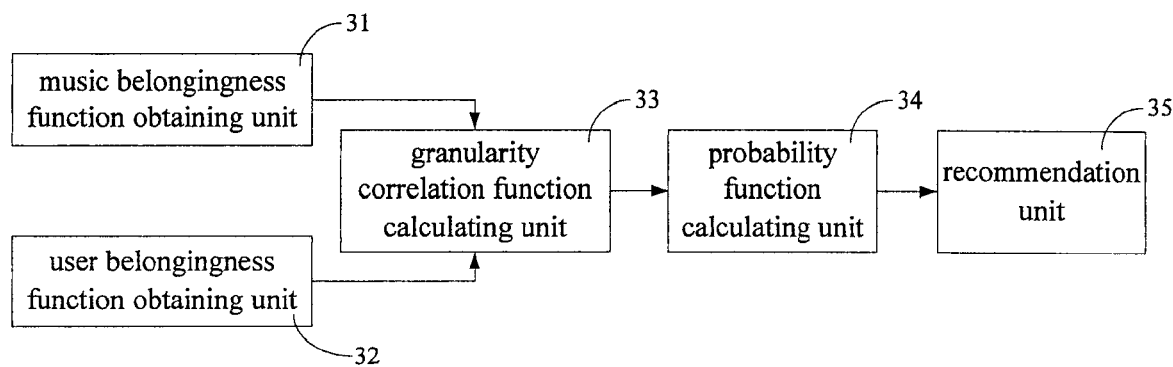
FIG. 3 shows a block diagram of the music recommendation apparatus according to an embodiment of the present invention.
Figure 4:
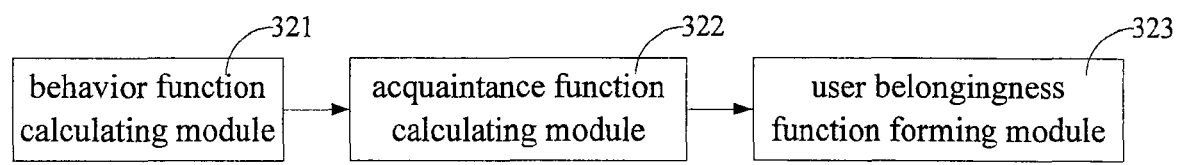
FIG. 4 shows a block diagram of the user belongingness function obtaining unit according to an embodiment of the present invention.

As shown in FIG. 3, it is a block diagram showing the music recommendation apparatus according to an embodiment of the present invention.

The music recommendation apparatus comprises a music belongingness function obtaining unit 31, a user belongingness function obtaining unit 32, a granularity correlation function calculating unit 33, a probability function calculating unit 34 and a recommendation unit 35.

The music belongingness function obtaining unit 31 is used for obtaining a music belongingness function, which is the set of granularity of music in different dimensions, wherein the dimension is the classification of music and the granularity is the classification of the dimension, and the expression of the music belongingness function is A(music, $P_k$)=$\{p_{kj}|j=1, 2, \ldots, n\}$, k=1, 2, ... m, wherein $P_k$ is the dimension, $p_{kj}$ is the granularity, m is the number of the dimensions and n is the number of the granularities in a dimension.

The user belongingness function obtaining unit 32 is used for obtaining a user belongingness function, which is the set of granularity indicating likes of user in different dimensions, and the expression of the user belongingness function is A(user, $P_k$)=$\{p_{ki}|i=1, 2 \ldots, n\}$, k=1, 2, ... m, wherein $P_k$ is the dimension, $p_{ki}$ is the granularity, m is the number of the dimensions and n is the number of the granularities in the dimension. Preferably, the number of the user belongingness function is at least one.

The granularity correlation function calculating unit 33 is used for calculating a granularity correlation function by using the music belongingness function and the user belongingness function, and the expression of the granularity correlation function is $$f(\text{user, music, } P_k) = \begin{cases} 0; & \text{when } A(\text{music, } P_k) \notin A(\text{user, } P_k) \\ 1; & \text{when } A(\text{music, } P_k) \in A(\text{user, } P_k). \end{cases}$$

The probability function calculating unit 34 is used for calculating the value of the probability function indicating likes of user for music by using the granularity correlation function and a dimension weighting coefficient, and the probability function indicating likes of user for music is $$F(\text{user, music}) = \sum_{k=1}^{m} (\alpha_k \cdot f(\text{user, music, } P_k)),$$

wherein $\alpha_k$ is the dimension weighting coefficient.

The recommendation unit 35 is used for recommending music to a user when the value of the probability function indicating likes of user for music is greater than a preset threshold.

The embodiments proposed in the present invention may provide personalized recommendation for different users according to the user belongingness function of each user and the music belongingness function of each piece of music, so as to improve users' satisfaction.

In an embodiment, the music belongingness function obtaining unit 31 obtains the music belongingness function of music by receiving manual input or performing program identification.

In another embodiment, the user belongingness function obtaining unit 32 obtains the user belongingness function of a user by receiving user input or analyzing user behavior.

In another embodiment, at least one user belongingness function is assigned to the user to characterize one or more tastes of the user more completely.

As a specific embodiment, the user belongingness function obtaining unit 32 may comprise a behavior function calculating module 321, an acquaintance function calculating module 322 and a user belongingness function forming module 323.

The behavior function calculating module 321 is used for getting the behavior function indicating likes of user for music according to the behavior that a user takes to music, and the expression of the behavior function indicating likes of user for music is $$F'(\text{user, music}) = \sum_{k=1}^{y} (q_k \cdot Q_k(\text{user, music})),$$

wherein $Q_k$(user, music) represents the result value of the $Q_k$ behavior that a user takes to music, $q_k$ is a behavior weighting coefficient and y is the number of the kinds of behavior.

The acquaintance function calculating module 322 is used for getting the acquaintance function between a user and a granularity by calculation using behavior function of a user, and the expression of the acquaintance function is $$f'(\text{user, } p_{ki}) = \sum_{j=1}^{x} F'(\text{user, } m_j) = \sum_{j=1}^{x} \sum_{k=1}^{y} q_k \cdot Q_k(\text{user, } m_j),$$

wherein $m_j$ is the music which belongs to a granularity $p_{ki}$ and x is the amount of the music which belongs to the granularity $p_{ki}$.

The user belongingness function forming module 323 is used for using the z granularities corresponding to the top z values as granularities in z user belongingness functions respectively to form z user belongingness functions, wherein the top z values are obtained from the descending values of the acquaintance function between a user and the granularities in each dimension, $z \geq 1$.

It is possible that continuous updating of the recommendation result according to user behavior is realized by this embodiment so as to ensure accurate recommendation.

For the specific work of above each unit and module, please see the corresponding steps of the method of the present invention.

The method according to one embodiment of the present invention may be implemented through use of a computer, server or any other kinds of processing devices known in the art. For example, the computer performs the steps of the above method by performing one or any combination of instructions, programs, software and data stored in a memory, a hard disk, a removable disk, a CD-ROM, or any other kinds of storage media known in the art.

The apparatus according to one embodiment of the present invention may be a computer system, a server or any other devices which may perform the steps of the above method. The units such as music belongingness function obtaining unit and so on, and the modules such as the behavior function calculating module and so on may be the components, logic circuits or other parts of the computer system, server which may have the corresponding function.

Although the present invention has been described with reference to several typical embodiments, it shall be understood that the terms used herein is to illustrate rather than limit the present invention. The present invention may be implemented in many particular embodiments without departing from the spirit and scope of the present invention, thus it shall be appreciated that the above embodiments shall not be limited to any details described above, but shall be interpreted broadly within the spirit and scope defined by the appended claims. The appended claims intend to cover all the modifications and changes falling within the scope of the appended claims and equivalents thereof.

What is claimed is:

1. A music recommendation method for use with a music recommendation apparatus, the method comprising:
    obtaining a music belongingness function of a first piece of music, the music belongingness function of music comprising a first set granularities of music in different dimensions, wherein the dimensions are classifications of music and the granularities are classifications of the dimensions, and an expression of the music belongingness function being $A(\text{music}, P_k) = \{p_{kj} | j=1, 2, \ldots, n\}$, $k=1, 2, \ldots m$, wherein $P_k$ represents a dimension, $p_{kj}$ represents a granularity, m represents a total number of the dimension and n represents a total number of the granularity in the dimension;
    obtaining a user belongingness function of a user, the user belongingness function comprising a second set of granularities indicating user music tastes in the different dimensions, and an expression of the user belongingness function being $A(\text{user}, P_k) = \{p_{ki} | i=1, 2 \ldots, n\}$, $k=1, 2, \ldots m$, wherein $P_k$ represents a dimension, $p_{ki}$ is a granularity, m represents a total number of the dimension and n represents a total number of the granularity in the dimension;
    calculating a granularity correlation function by using the music belongingness function and the user belongingness function, and an expression of the granularity correlation function being $$f(\text{user}, \text{music}, P_k) = \begin{cases} 0; & \text{when } A(\text{music}, P_k) \notin A(\text{user}, P_k) \\ 1; & \text{when } A(\text{music}, P_k) \in A(\text{user}, P_k); \end{cases}$$

calculating a value of a probability function indicating user music tastes by using the granularity correlation function and a dimension weighting coefficient, and the probability function indicating user music tastes being expressed as $$F(\text{user}, \text{music}) = \sum_{k=1}^{m} (\alpha_k \cdot f(\text{user}, \text{music}, P_k)),$$

wherein $\alpha_k$ is the dimension weighting coefficient; and
    recommending the first piece of music to the user when the value of the probability function indicating user music tastes for the first piece of music is greater than a preset threshold;
    wherein the obtaining the user belongingness function comprises:
    getting a behavior function indicating user music tastes according to a behavior that the user takes to a second piece of music, and an expression of the behavior function indicating user music tastes being expressed as $$F'(\text{user}, \text{music}) = \sum_{k=1}^{y} (q_k \cdot Q_k(\text{user}, \text{music})),$$

wherein $Q_k(\text{user}, \text{music})$ represents a result value of a $Q_k$ behavior that the user takes to the second piece of music; $q_k$ represents a behavior weighting coefficient and y represents a total number of kinds of behavior;
    calculating an acquaintance function between the user and a third set of granularities by using the behavior function, and an expression of the acquaintance function being $$f'(\text{user}, p_{ki}) = \sum_{j=1}^{x} F'(\text{user}, m_j),$$

wherein $m_j$ represents a third piece of music which belongs to the granularity $p_{ki}$ and x represents a total number of the third pieces of music which belongs to the granularity $p_{ki}$; and
    using a fourth set of granularities corresponding to top z values of descending values of the acquaintance function between the user and the third set of granularities in each dimension as granularities in z user belongingness functions respectively to form z user belongingness functions, $z \geq 1$.

2. The music recommendation method according to claim 1, wherein the obtaining the music belongingness function of the first piece of music comprises obtaining the music belongingness function of the first piece of music by one of the following ways: receiving manual input and performing program identification.

3. The music recommendation method according to claim 1, wherein at least one user belongingness function is assigned to the user.

4. A computerized music recommendation apparatus comprising:
    a music belongingness function obtaining unit for obtaining a music belongingness function of a first piece of music, the music belongingness function comprising a first set of granularities of music in different dimensions, wherein the dimensions are classifications of music and the granularities are classifications of the dimensions, and an expression of the music belongingness function being $A(\text{music}, P_k) = \{p_{kj} | j=1, 2, \ldots, n\}$, $k=1, 2, \ldots m$, wherein $P_k$ represents a dimension, $p_{kj}$ represents a granularity, m represents a total number of the dimension and n represents a total number of the granularities in the dimension;
    a user belongingness function obtaining unit for obtaining a user belongingness function of a user, the user belongingness function comprising a second set of granularities indicating user music tastes in the different dimensions, and an expression of the user belongingness function being $A(\text{user}, P_k) = \{p_{ki} | i=1, 2 \ldots, n\}$, $k=1, 2, \ldots m$, wherein $P_k$ represents dimension, $p_{ki}$ represents a granularity, m represents a total number of the dimensions and n represents a total number of the granularity in the dimension;
    a granularity correlation function calculating unit for calculating a granularity correlation function by using the music belongingness function and the user belongingness function, and an expression of the granularity correlation function being $$f(\text{user, music}, P_k) = \begin{cases} 0; & \text{when } A(\text{music}, P_k) \notin A(\text{user}, P_k) \\ 1; & \text{when } A(\text{music}, P_k) \in A(\text{user}, P_k); \end{cases}$$

a probability function calculating unit for calculating a value of a probability function indicating user music tastes by using the granularity correlation function and a dimension weighting coefficient, and the probability function indicating user music tastes being expressed as $$F(\text{user, music}) = \sum_{k=1}^{m} (\alpha_k \cdot f(\text{user, music}, P_k)),$$

wherein $\alpha_k$ is the dimension weighting coefficient; and
a recommendation unit for recommending the first piece of music to the user when the value of the probability function indicating user music tastes for the first piece of music is greater than a preset threshold,
wherein the user belongingness function obtaining unit comprises:
a behavior function calculating module for getting a behavior function indicating user music tastes according to a behavior that the user takes to a second piece of music, and an expression of the behavior function indicating the music tastes of user being expressed as $$F'(\text{user, music}) = \sum_{k=1}^{y} (q_k \cdot Q_k(\text{user, music})),$$

wherein $Q_k(\text{user, music})$ represents a result value of a $Q_k$ behavior that the user takes to the second piece of music, $q_k$ represents a behavior weighting coefficient and y represents a total number of kinds of behavior;

an acquaintance function calculating module for getting an acquaintance function between the user and a third set of granularities by calculation using the behavior function, and an expression of the acquaintance function being $$f'(\text{user}, p_{ki}) = \sum_{j=1}^{x} F'(\text{user}, m_j),$$

wherein $m_j$ represents a third piece of music which belongs to the granularity $p_{ki}$ and x represents a total number of the third piece of music which belongs to the granularity $p_{ki}$; and
a user belongingness function forming module for using a fourth set of granularities corresponding to top z values of descending values of the acquaintance function between the user and the third set of granularities in each dimension as granularities in z user belongingness functions respectively to form z user belongingness functions, wherein $z \geq 1$;
wherein the computerized music recommendation apparatus is configured to execute the music belongingness function obtaining unit, the user belongingness function obtaining unit, the granularity correlation function calculating unit, the probability function calculating unit, the recommendation unit, the behavior function calculating module, the acquaintance function calculating module, and the user belongingness function forming module.

5. The music recommendation apparatus according to claim 4, wherein the music belongingness function obtaining unit obtains the music belongingness function of the first piece of music by one of the following ways: receiving manual input and performing program identification.

6. The music recommendation apparatus according to claim 4, wherein at least one user belongingness function is assigned to the user.

* * * * *